(12) United States Patent
Sheinman et al.

(10) Patent No.: US 11,400,516 B2
(45) Date of Patent: Aug. 2, 2022

(54) METHOD AND SYSTEM FOR ADDITIVE MANUFACTURING WITH POWDER MATERIAL

(71) Applicant: Stratasys Ltd., Rehovot (IL)

(72) Inventors: Yehoshua Sheinman, RaAnana (IL); Shai Hirsch, Rehovot (IL)

(73) Assignee: Stratasys Ltd., Rehovot (IL)

( * ) Notice: Subject to any disclaimer, the term of this patent is extended or adjusted under 35 U.S.C. 154(b) by 357 days.

(21) Appl. No.: 16/495,407

(22) PCT Filed: Mar. 20, 2018

(86) PCT No.: PCT/IL2018/050317
§ 371 (c)(1),
(2) Date: Sep. 19, 2019

(87) PCT Pub. No.: WO2018/173048
PCT Pub. Date: Sep. 27, 2018

(65) Prior Publication Data
US 2020/0016656 A1    Jan. 16, 2020

Related U.S. Application Data

(60) Provisional application No. 62/473,602, filed on Mar. 20, 2017.

(51) Int. Cl.
*B22F 10/10* (2021.01)
*B33Y 10/00* (2015.01)
(Continued)

(52) U.S. Cl.
CPC ............... *B22F 10/10* (2021.01); *B22F 3/04* (2013.01); *B28B 1/001* (2013.01); *B29C 64/165* (2017.08);
(Continued)

(58) Field of Classification Search
CPC .......... B28B 1/001; B33Y 10/00; B33Y 40/20
See application file for complete search history.

(56) References Cited

U.S. PATENT DOCUMENTS

| 4,247,508 A | 1/1981 | Housholder |
| 4,806,985 A | 2/1989 | Foley et al. |

(Continued)

FOREIGN PATENT DOCUMENTS

| CN | 1496769 | 11/1999 |
| CN | 1671503 | 9/2005 |

(Continued)

OTHER PUBLICATIONS

Translation dated Oct. 14, 2021 of Notification of Office Action dated Sep. 23, 2021 From the State Intellectual Property Office of the People's Republic of China Re. Application No. 201880027064.7. (8 Pages).

(Continued)

*Primary Examiner* — Mary Lynn F Theisen

(57) ABSTRACT

A method for producing a three-dimensional model via additive manufacturing includes building a green block in a layerwise manner with a powder material and a solidifiable non-powder material. The green block includes a green usable model. The solidified non-powder material is removed from the green block to extract the green usable model from the green block and the density of the green usable model is increased by applying Cold Isostatic Pressing (CIP). The green usable model is then sintered to produce a three-dimensional model.

21 Claims, 9 Drawing Sheets

(51) Int. Cl.
*B33Y 30/00* (2015.01)
*B29C 64/20* (2017.01)
*B29C 64/165* (2017.01)
*B29C 64/188* (2017.01)
*B33Y 40/20* (2020.01)
*B22F 3/04* (2006.01)
*B28B 1/00* (2006.01)

(52) U.S. Cl.
CPC ............ *B29C 64/188* (2017.08); *B29C 64/20* (2017.08); *B33Y 10/00* (2014.12); *B33Y 30/00* (2014.12); *B33Y 40/20* (2020.01); *B22F 2301/052* (2013.01)

(56) References Cited

U.S. PATENT DOCUMENTS

| | | |
|---|---|---|
| 5,076,869 A | 12/1991 | Bourell et al. |
| 5,139,338 A | 8/1992 | Pomerantz et al. |
| 5,154,881 A | 10/1992 | Rutz et al. |
| 5,204,055 A | 4/1993 | Sachs et al. |
| 5,263,130 A | 11/1993 | Pomerantz et al. |
| 5,287,435 A | 2/1994 | Cohen et al. |
| 5,354,414 A | 10/1994 | Feygin |
| 5,387,380 A | 2/1995 | Cima et al. |
| 5,519,816 A | 5/1996 | Pomerantz et al. |
| 5,555,481 A | 9/1996 | Rock et al. |
| 5,637,175 A | 6/1997 | Feygin et al. |
| 5,649,277 A | 7/1997 | Greul et al. |
| 5,695,708 A | 12/1997 | Karp et al. |
| 5,744,433 A | 4/1998 | Storstrom et al. |
| 5,902,537 A | 5/1999 | Almquist et al. |
| 5,937,265 A | 8/1999 | Pratt et al. |
| 6,036,777 A | 3/2000 | Sachs |
| 6,147,138 A | 11/2000 | Hochsmann |
| 6,193,923 B1 | 2/2001 | Leyden et al. |
| 6,589,471 B1 | 7/2003 | Khoshnevis |
| 7,141,207 B2 | 11/2006 | Jandeska, Jr. et al. |
| 7,148,840 B2 | 12/2006 | Dooi |
| 7,460,984 B1 | 12/2008 | Clark et al. |
| 7,896,639 B2 | 3/2011 | Kritchman et al. |
| 8,119,053 B1 | 2/2012 | Bedal et al. |
| 8,682,395 B2 | 3/2014 | Muhammad |
| 8,810,537 B2 | 8/2014 | Yousefpor et al. |
| 8,907,929 B2 | 12/2014 | Li et al. |
| 9,573,323 B2 | 2/2017 | Heide |
| 10,730,109 B2 | 8/2020 | Sheinman et al. |
| 2003/0063138 A1 | 4/2003 | Varnon et al. |
| 2004/0018107 A1 | 1/2004 | Khoshnevis |
| 2004/0146650 A1 | 7/2004 | Lockard et al. |
| 2004/0224173 A1 | 11/2004 | Boyd et al. |
| 2006/0246222 A1 | 11/2006 | Winkler |
| 2007/0241482 A1 | 10/2007 | Giller et al. |
| 2008/0111271 A1 | 5/2008 | Khoshnevis |
| 2009/0255912 A1 | 10/2009 | Dietrich |
| 2010/0321325 A1 | 12/2010 | Springer et al. |
| 2011/0241947 A1 | 10/2011 | Scott et al. |
| 2013/0186514 A1 | 7/2013 | Zhuang et al. |
| 2013/0186558 A1 | 7/2013 | Comb et al. |
| 2013/0241113 A1 | 9/2013 | Geers et al. |
| 2014/0110872 A1 | 4/2014 | Levy et al. |
| 2014/0134962 A1 | 5/2014 | Huynh et al. |
| 2014/0170012 A1 | 6/2014 | Delise et al. |
| 2015/0273769 A1 | 10/2015 | Korn |
| 2015/0301651 A1 | 10/2015 | Leigh et al. |
| 2015/0324029 A1 | 11/2015 | Bakken et al. |
| 2016/0107383 A1 | 4/2016 | Dikovsky et al. |
| 2016/0114427 A1 | 4/2016 | Eibl et al. |
| 2016/0158843 A1 | 6/2016 | Yolton et al. |
| 2016/0158889 A1 | 6/2016 | Carter et al. |
| 2016/0195943 A1 | 7/2016 | Gur et al. |
| 2017/0072636 A1 | 3/2017 | Ng et al. |
| 2017/0173696 A1 | 6/2017 | Sheinman |
| 2017/0176979 A1 | 6/2017 | Lalish et al. |
| 2017/0239719 A1 | 8/2017 | Buller et al. |
| 2017/0240472 A1 | 8/2017 | Blacker et al. |
| 2017/0278586 A1* | 9/2017 | van Staden ............. C04B 35/80 |
| 2017/0305067 A1 | 10/2017 | Cortes et al. |
| 2018/0036801 A1* | 2/2018 | Ishihara .................. B28B 11/10 |
| 2018/0103728 A1 | 4/2018 | Koo |
| 2018/0104793 A1 | 4/2018 | Franke et al. |
| 2018/0297284 A1 | 10/2018 | Fulop et al. |
| 2019/0134705 A1 | 5/2019 | Sheinman et al. |
| 2019/0232367 A1 | 8/2019 | Sheinman et al. |
| 2020/0070246 A1 | 3/2020 | Sheinman et al. |
| 2021/0291273 A1 | 9/2021 | Sheinman et al. |
| 2022/0049331 A1* | 2/2022 | Valls Anglé ............. B22F 3/04 |

FOREIGN PATENT DOCUMENTS

| | | |
|---|---|---|
| CN | 100336655 | 9/2007 |
| CN | 100406169 | 7/2008 |
| CN | 101516552 | 8/2009 |
| CN | 102189261 | 9/2011 |
| CN | 203109234 | 8/2013 |
| CN | 103801696 | 5/2014 |
| CN | 104628393 | 5/2014 |
| CN | 103842157 | 6/2014 |
| CN | 104536625 | 4/2015 |
| CN | 104907567 | 9/2015 |
| CN | 104968500 | 10/2015 |
| CN | 105408095 | 3/2016 |
| CN | 106077651 | 11/2016 |
| CN | 106488820 | 3/2017 |
| DE | 10344901 | 5/2004 |
| DE | 102009029765 | 12/2010 |
| EP | 0250121 | 12/1987 |
| EP | 0500225 | 8/1992 |
| EP | 2728449 | 5/2014 |
| EP | 2747193 | 6/2014 |
| EP | 102013011676 | 1/2015 |
| JP | 60-200901 | 10/1985 |
| JP | 06-179243 | 6/1994 |
| JP | 07-88726 | 4/1995 |
| JP | 2005-533927 | 11/2005 |
| JP | 2015-196265 | 11/2015 |
| JP | 2015-202683 | 11/2015 |
| JP | 2016-078097 | 5/2016 |
| TW | 201331026 | 8/2013 |
| WO | WO 98/28124 | 7/1998 |
| WO | WO 2004/009281 | 1/2004 |
| WO | WO 2004/058487 | 7/2004 |
| WO | WO 2013/021173 | 2/2013 |
| WO | WO 2014/068579 | 5/2014 |
| WO | WO 2015/170330 | 11/2015 |
| WO | WO 2016/147448 | 9/2016 |
| WO | WO 2016/176432 | 11/2016 |
| WO | WO 2017/179052 | 10/2017 |
| WO | WO 2017/179052 A8 | 10/2017 |
| WO | WO 2018/118009 | 6/2018 |
| WO | WO 2018/173048 | 9/2018 |
| WO | WO 2018/173050 | 9/2018 |
| WO | WO 2020/129054 | 6/2020 |

OTHER PUBLICATIONS

International Preliminary Report on Patentability dated Jul. 1, 2021 From the International Bureau of WIPO Re. Application No. PCT/IL2019/051374. (9 Pages).

Official Action dated Sep. 18, 2020 from the US Patent and Trademark Office Re. U.S. Appl. No. 15/304,873. (25 pages).

Interview Summary dated Jan. 22, 2021 from the US Patent and Trademark Office Re. U.S. Appl. No. 16/381,042. (2 pages).

Notice of Allowance dated Jan. 14, 2021 from the US Patent and Trademark Office Re. U.S. Appl. No. 15/304,873. (14 pages).

Notice of Reason(s) for Rejection dated Oct. 22, 2021 From the Japan Patent Office Re. Application No. 2021-121341 and Its Translation Into English. (6 Pages).

Examination Report Under Sections 12 & 13 of the Patents Act, 1970 and the Patents Rules, 2003 dated Mar. 5, 2021 From the Government of India, Intellectual Property India, Patents, Designs,

(56) References Cited

OTHER PUBLICATIONS

Trade Marks, Geographical Indications, The Patent Office Re. Application No. 201827040181. (8 Pages).
Communication Pursuant to Article 94(3) EPC dated Sep. 11, 2020 From the European Patent Office Re. Application No. 18720380.7. (7 Pages).
Communication Pursuant to Article 94(3) EPC dated Sep. 11, 2020 From the European Patent Office Re. Application No. 18722739.2. (6 Pages).
Communication Pursuant to Article 94(3) EPC dated Jun. 17, 2021 From the European Patent Office Re. Application No. 18722739.2. (8 Pages).
Grounds of Reasons for Rejection dated Mar. 29, 2021 From the Korean Intellectual Property Office Re. Application No. 10-2018-7032441 and Its Translation Into English. (5 Pages).
Examination Report dated Jul. 12, 2021 From the Servico Publico Federal, Ministerio da Economia, Institute Nacional da Propriedade Industrial do Brasil Re Application No. BR11 2018 07980 8. (4 Pages).
English Translation of Examination Report dated Jul. 12, 2021 From the Servico Publico Federal, Ministerio da Economia, Instituto Nacional da Propriedade Industrial do Brasil Re Application No. BR112018070980.8. (4 Pages).
Official Action dated Jan. 2, 2020 From the US Patent and Trademark Office Re. U.S. Appl. No. 16/092,770. (30 pages).
Communication Pursuant to Article 94(3) EPC dated Jun. 17, 2021 From the European Patent Office Re. Application No. 18720380.7 (5 Pages).
Final Official Action dated Jul. 8, 2020 from the US Patent and Trademark Office Re. U.S. Appl. No. 15/304,873. (31 pages).
Restriction Official Action dated Jan. 30, 2020 From the US Patent and Trademark Office Re. U.S. Appl. No. 16/381,042. (7 pages).
Notification of Office Action and Search Report dated Nov. 12, 2021 From the State Intellectual Property Office of the People's Republic of China Re. Application No. 201880023654.2. (16 Pages).
Notification of Office Action dated Feb. 2, 2021 From the State Intellectual Property Office of the People's Republic of China Re. Application No. 201780031178.4 and Its Translation Into English. (11 Pages).
Advisory Action dated Apr. 1, 2020 from the US Patent and Trademark Office Re. U.S. Appl. No. 16/092,770. (2 pages).
International Search Report and the Written Opinion dated Mar. 19, 2020 From the International Searching Authority Re. Application No. PCT/IL2019/051374. (14 Pages).
Office Action dated Mar. 24, 2020 From the Israel Patent Office Re. Application No. 248806 and Its Translation Into English. (4 Pages).
Schulz et al. "Polyhedral Surface Approximation of Non-Convex Voxel Sets Through the Modification of Convex Hulls", Proceedings of the 12th International Workshop on Combinatorial Image Analysis, IWCIA '08, XP019087154, p. 38-50, Apr. 7, 2008.
Zwier et al. "Design for Additive Manufacturing: Automated Build Orientation Selection and Optimization", 5th CIRP Global Web Conference Research and Innovation for Future Production, Procedia CIRP, XP055373404, 55: 128-133, Jan. 2016.
Interview Summary dated Aug. 31, 2020 from the US Patent and Trademark Office Re. U.S. Appl. No. 15/304,873. (3 pages).
Notification of Office Action and Search Report dated Jun. 1, 2020 From the State Intellectual Property Office of the People's Republic of China Re. Application No. 201780031178.4. (13 Pages).
Translation dated Jun. 9, 2020 of Notification of Office Action dated Jun. 1, 2020 From the State Intellectual Property Office of the People's Republic of China Re. Application No. 201780031178.4. (8 Pages).
Communication Pursuant to Article 94(3) EPC dated Apr. 28, 2020 From the European Patent Office Re. Application No. 19172027.5. (7 Pages).
Corrected Written Opinion dated May 25, 2020 From the International Searching Authority Re. Application No. PCT/IL2019/051374. (5 Pages).
Official Action dated May 11, 2020 from the US Patent and Trademark Office Re. U.S. Appl. No. 16/381,042. (31 pages).
Communication Pursuant to Article 94(3) EPC dated Jun. 5, 2019 From the European Patent Office Re. Application No. 17723527.2. (7 Pages).
European Search Report and the European Search Opinion dated Jul. 4, 2019 From the European Patent Office Re. Application No. 19172027.5. (16 Pages).
International Preliminary Report on Patentability dated Jun. 1, 2016 From the International Preliminary Examining Authority Re. Application No. PCT/IL2015/050478.
International Preliminary Report on Patentability Dated Oct. 3, 2019 From the International Bureau of WIPO Re. Application No. PCT/IL2018/050317. (12 Pages).
International Preliminary Report on Patentability dated Oct. 3, 2019 From the International Bureau of WIPO Re. Application No. PCT/IL2018/050319. (12 Pages).
International Preliminary Report on Patentability dated Oct. 25, 2018 From the International Bureau of WIPO Re. Application No. PCT/IL2017/050439. (16 Pages).
International Search Report and the Written Opinion dated Aug. 13, 2015 From the International Searching Authority Re. Application No. PCT/IL2015/050478.
International Search Report and the Written Opinion dated Jul. 21, 2017 From the International Searching Authority Re. Application No. PCT/IL2017/050439. (21 Pages).
International Search Report and the Written Opinion dated Jun. 26, 2018 From the International Searching Authority Re. Application No. PCT/IL2018/050317. (17 Pages).
International Search Report and the Written Opinion dated Jun. 26, 2018 From the International Searching Authority Re. Application No. PCT/IL2018/050319. (18 Pages).
Notification of Office Action and Search Report dated Sep. 3, 2018 From the State Intellectual Property Office of the People's Republic of China Re. Application No. 201580037461.9. (5 Pages).
Notification of Office Action dated Jan. 22, 2018 From the State Intellectual Property Office of the People's Republic of China Re. Application No. 201580037461.9 and Its Translation into English.(7 Pages).
Official Action dated Mar. 5, 2019 From the US Patent and Trademark Office Re. U.S. Appl. No. 15/304,873. (37 pages).
Official Action dated Oct. 11, 2019 From the US Patent and Trademark Office Re. U.S. Appl. No. 16/092,770. (39 Pages).
Official Action dated Oct. 29, 2019 From the US Patent and Trademark Office Re. U.S. Appl. No. 15/304,873. (28 Pages).
Restriction Official Action dated Nov. 6, 2018 From the US Patent and Trademark Office Re. U.S. Appl. No. 15/304,873. (9 pages).
Restriction Official Action dated Aug. 15, 2019 From the US Patent and Trademark Office Re. U.S. Appl. No. 16/092,770. (10 pages).
Supplementary European Search Report and the European Search Opinion dated Jan. 2, 2018 From the European Patent Office Re. Application No. 15789324.9. (7 Pages).
Translation dated Sep. 17, 2018 of Notification of Office Action dated Sep. 3, 2018 From the State Intellectual Property Office of the People's Republic of China Re. Application No. 201580037461.9. (1 Page).
Lai et al. "ExtendThumb: A Target Acqusition Approach for One-Handed Interaction With Touch-Screen Mobile Phones", IEEE Transactions on Human-Machine Systems, 45(3): 362-370, Dec. 18, 2014. Abstract.
Notification of Office Action and Search Report dated Apr. 6, 2021 From the State Intellectual Property Office of the People's Republic of China Re. Application No. 201880023654.2 and Its Translation of Office Action Into English. (34 Pages).
Shuzhu "Cemented Carbide Production Principle and Quality Control", p. 204-209, Aug. 31, 2014.
Final Official Action dated Sep. 25, 2020 from the US Patent and Trademark Office Re. U.S. Appl. No. 16/381,042. (28 pages).
Examination Report dated Jul. 12, 2021 From the Servico Publico Federal, Ministerio da Economia, Instituto Nacional da Propriedade Industrial do Brasil Re Application No. BR11 2018 07980 8. (4 Pages).

(56) References Cited

OTHER PUBLICATIONS

Notice of Reasons for Rejection dated Mar. 9, 2021 From the Japan Patent Office Re. Application No. 2018-553387 and Its Translation Into English. (4 Pages).

Notification of Office Action and Search Report dated Mar. 26, 2021 From the State Intellectual Property Office of the People's Republic of China Re. Application No. 201880027064.7 and Its Translation of Office Action Into English. (21 Pages).

Han "Powder Metallurgy Machinery Parts, 1st Edition", Machinery Industry Press, p. 45-51, Dec. 1987.

European Search Report and the European Search Opinion dated May 25, 2021 From the European Patent Office Re. Application No. 21156079.2. (12 Pages).

Notification of Office Action dated Sep. 23, 2021 From the State Intellectual Property Office of the People's Republic of China Re. Application No. 201880027064.7. (7 Pages).

Notification of Office Action and Search Report dated Nov. 12, 2021 From the State Intellectual Property Office of the People's Republic of China Re. Application No. 201880023654.2 together with an English Summary. (25 Pages).

English Translation dated Feb. 2, 2022 of Notice of Reason(s) for Rejection dated Jan. 25, 2022 From the Japan Patent Office Re. Application No. 2019-552114. (6 Pages).

Notice of Reason(s) for Rejection dated Jan. 25, 2022 From the Japan Patent Office Re. Application No. 2019-552114. (6 Pages).

Restriction Official Action dated Jan. 12, 2022 from US Patent and Trademark Office Re. U.S. Appl. No. 16/495,410. (9 pages).

Han et al. "Super-Resolution Electrohydrodynamic (EHD) 3D Printing of Micro-Structures Using Phase-Change Inks", Manufacturing Letters, 2(4): 96-99, Oct. 2014.

Notice of Reasons for Rejection dated Mar. 18, 2022 From the Japan Patent Office Re. Application No. 2014-513308 together with an English Summay. (9 Pages).

\* cited by examiner

METHOD AND SYSTEM FOR ADDITIVE MANUFACTURING WITH POWDER MATERIAL

RELATED APPLICATIONS

This application is a National Phase of PCT Patent Application No. PCT/IL2018/050317 having International filing date of Mar. 20, 2018, which claims the benefit of priority under 35 USC § 119(e) of U.S. Provisional Patent Application No. 62/473,602 filed on Mar. 20, 2017. The contents of the above applications are all incorporated by reference as if fully set forth herein in their entirety.

FIELD AND BACKGROUND OF THE INVENTION

The present invention, in some embodiments thereof, relates to the field of additive manufacturing and, more particularly, but not exclusively, to methods and systems for producing three-dimensional printed models having a high material density.

A number of different processes for fabricating solid objects by additive manufacturing with successive layers of powdered material are known. Some known additive manufacturing techniques selectively apply a liquid binder material based on a three dimensional (3D) model of the object, binding the powdered material together layer by layer to create a solid structure. In some processes, the object is heated and/or sintered to further strengthen bonding of the material at the end of the building process.

Selective Laser Sintering (SLS) uses a laser as the power source to sinter layers of powdered material. The laser is controlled to aim at points in space defined by a 3D model, binding the material together layer by layer to create a solid structure. Selective laser melting (SLM) is a technique comparable to SLS that comprises full melting of the material instead of sintering. SLM is typically applied when the melting temperature of the powder is uniform, e.g. when pure metal powders are used as the building material.

U.S. Pat. No. 4,247,508 entitled "MOLDING PROCESS", the contents of which are incorporated herein by reference, describes a molding process for forming a 3D article in layers. In one embodiment, planar layers of material are sequentially deposited. In each layer, prior to the deposition of the next layer, a portion of its area is solidified to define that portion of the article in that layer. Selective solidification of each layer may be accomplished by using heat and a selected mask or by using a controlled heat scanning process. Instead of using a laser to selectively fuse each layer, a separate mask for each layer and a heat source may be employed. The mask is placed over its associated layer and a heat source located above the mask. Heat passing through the opening of the mask will fuse together the particles exposed through the opening of the mask. The particles not exposed to the direct heat will not be fused.

U.S. Pat. No. 5,076,869 entitled "MULTIPLE MATERIAL SYSTEMS FOR SELECTIVE BEAM SINTERING", the contents of which are incorporated herein by reference, describes a method and apparatus for selectively sintering a layer of powder to produce a part comprising a plurality of sintered layers. The apparatus includes a computer controlling a laser to direct the laser energy onto the powder to produce a sintered mass. For each cross-section, the aim of the laser beam is scanned over a layer of powder and the beam is switched on to sinter only the powder within the boundaries of the cross-section. Powder is applied and successive layers sintered until a completed part is formed. Preferably, the powder comprises a plurality of materials having different dissociation or bonding temperatures. The powder preferably comprises blended or coated materials.

International Patent Publication No. WO 2015/170330 entitled "METHOD AND APPARATUS FOR 3D PRINTING BY SELECTIVE SINTERING", the contents of which is incorporated herein by reference, discloses a method for forming an object by 3D printing that includes providing a layer of powder on a building tray, performing die compaction on the layer, sintering the layer that is die compacted by selective laser sintering or selective laser melting and repeating the providing, the die compaction and the sintering per layer until the three dimensional object is completed. The selective sintering disclosed is by a mask pattern that defines a negative of a portion of the layer to be sintered.

SUMMARY OF THE INVENTION

According to an aspect of some embodiments of the present disclosure there is provided a system and method for post-processing a green compact built by additive manufacturing with powder layers. In some example embodiments, an aluminum alloy powder is used as the building material. Optionally, other materials such as pure aluminum, other metal powders, powdered ceramic material, powdered plastic polymer material or any combination of powdered materials may be used. Optionally, at the termination of the layer building process, a green compact block is formed including a pattern embedded therein that defines one or more green objects. According to some exemplary embodiments, the green compact is compressed by Cold Isostatic Pressing (CIP). Optionally CIP is applied to increase density of the one or more green bodies, e.g. green objects that are embedded within the compact, e.g. the compact block. The CIP may increase density of the material forming the green objects to about 90-97% of a wrought density of the building material. The remaining 3-10% may be air. Optionally, a density of green bodies prior to CIP may be 85-90% of a wrought density of the building material.

After CIP, the green objects embedded within the green compact may be separated from surrounding support elements and may be sintered. In some example embodiments, a second CIP process may be applied to further increase the density of the green objects (or one green object) prior to sintering. Optionally the second CIP process is applied on the green objects itself after the solidifiable ink and supporting material in the green compact has been removed. In some example embodiments, the second CIP process may bring the density of material forming the object above 95% and close to 100% of its wrought density.

According to an aspect of some example embodiments, there is provided a method for producing a three-dimensional model via additive manufacturing, said method comprising: building a green block in a layerwise manner with a powder material and a solidifiable non-powder material, said green block including a green usable model; removing the solidified non-powder material from the green block to extract the green usable model from the green block; increasing the density of the green usable model by applying Cold Isostatic Pressing (CIP); and sintering the green usable model to produce a three-dimensional model.

Optionally, said CIP is applied to the green block including the green usable model.

Optionally, said CIP is applied to the green usable model after extraction from the green block.

Optionally, a first CIP is applied to the green block including the green usable model and a second CIP is applied to the green usable model after separation from the green block.

Optionally, the green usable model is a green compact of a usable model.

Optionally, the step of building a green block in a layerwise manner is performed via an additive manufacturing system configured to build a layer by (1) printing a pattern with a solidifiable non-powder material to trace the contour of the green usable model; (2) dispensing and spreading a powder material over said pattern; and (3) compacting the powder layer with said pattern.

Optionally, said powder material is selected from an alloy powder, a pure metal powder, a ceramic powder, a polymeric powder, and any combination or mixture thereof.

Optionally, the powder material is an aluminum alloy.

Optionally, said solidifiable non-powder material is a solidifiable ink selected from photocurable inks, wax, thermal inks and any combination thereof.

Optionally, the step of removing the solidified non-powder material from the green block is made by heating said green block to melt, burn or evaporate said solidified non-powder material.

Optionally, wherein the green usable model is extracted from the green block by removing the green support elements.

Optionally, applying a CIP to the green block comprises inserting said green block into a wet-bag, optionally removing the air from the wet-bag, placing said wet-bag into a CIP chamber, and applying an isostatic pressure to said wet-bag comprising the green block.

Optionally, the isostatic pressure is up to 2,500 bar.

Optionally, applying a CIP to the green usable model after extraction from the green block comprises inserting said green usable model into a wet-bag together with a cushioning material, optionally removing the air from the wet bag, placing said wet-bag into a CIP chamber, and applying an isostatic pressure to the wet-bag comprising the green usable model.

Optionally, the isostatic pressure is applied in two steps, wherein the first step comprises applying a first isostatic pressure sufficient to melt the cushioning material to make it flow within the hollow structure of the green usable model, and the second step comprises applying a second isostatic pressure to compact the green usable model.

Optionally, the cushioning material is powdered wax, the first isostatic pressure is up to 50 bar and the second isostatic pressure is up to 2,600 bar.

Optionally, a temperature applied during CIP is about 40° C.

According to an aspect of some example embodiments, there is provided a method for producing three-dimensional models via additive manufacturing, said method comprising: building a green block in a layerwise manner with a powder material and a solidifiable non-powder material, said green block including one or more green compacts of a usable model and one or more green compacts of support elements, wherein the usable models and the support elements are delimited by patterning lines formed by selective deposition of the solidifiable non-powder material; increasing the density of the one or more green compacts of a usable model by applying CIP to the green block; heating the green block to remove the solidified non-powder material; extracting the one or more green compacts of a usable model from the green block by removing the one or more green compacts of support elements; and sintering the one or more green compacts of a usable model to produce three-dimensional models.

According to an aspect of some example embodiments, there is provided a method for producing three-dimensional models via additive manufacturing, said method comprising: building a green block in a layerwise manner with a powder material and a solidifiable non-powder material, said green block including one or more green compacts of a usable model and one or more green compacts of support elements, wherein the usable models and the support elements are delimited by patterning lines formed by selective deposition of the solidifiable non-powder material; increasing the density of the one or more green compacts of a usable model by applying a first CIP to the green block; heating the green block to remove the solidified non-powder material; extracting the one or more green compacts of a usable model from the green block by removing the one or more green compacts of support elements; further increasing the density of the one or more green compacts of a usable model by applying a second CIP to said one or more green compacts after their extraction from the green block; sintering the one or more green compacts of a usable model to produce three-dimensional models.

According to an aspect of some example embodiments, there is provided a method for producing three-dimensional models via additive manufacturing, said method comprising: building a green block in a layerwise manner with a powder material and a solidifiable non-powder material, said green block including one or more green compacts of a usable model and one or more green compacts of support elements, wherein the usable models and the support elements are delimited by patterning lines formed by selective deposition of the solidifiable non-powder material, heating the green block to remove the solidified non-powder material; extracting the one or more green compacts of a usable model from the green block by removing the one or more green compacts of support elements; increasing the density of the one or more green compacts of a usable model by applying a CIP to said one or more green compacts after their extraction from the green block; sintering the one or more green compacts of a usable model to produce three-dimensional models.

According to an aspect of some example embodiments, there is provided a method for increasing the density of a green usable model, said method comprising inserting said green usable model into a wet-bag together with a cushioning material, optionally removing the air from the wet bag, placing said wet-bag into a CIP chamber, and applying an isostatic pressure to said wet-bag to increase the density of said green usable model.

Optionally, the isostatic pressure is applied in two steps, wherein the first step comprises applying a first isostatic pressure sufficient to melt the cushioning material and make it flow within hollow structures of the green usable model, and the second step comprises applying a second isostatic pressure to increase the density of said green usable model while the cushioning material helps maintain the structural integrity of the green usable model.

Optionally, the cushioning material is powdered wax, the first isostatic pressure is up to 50 bar and the second isostatic pressure is up to 2,600 bar.

According to an aspect of some example embodiments, there is provided a system for producing a three-dimensional model via additive manufacturing, the system comprising: an additive manufacturing system comprising a printing platform station, a powder dispensing station, a powder spreading station, and a compacting station; an additional standalone compacting station; and a sintering station.

Optionally, said additional standalone compacting station is a CIP station.

Optionally, the powder dispensing station and the powder spreading station are included into a single powder delivery station.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
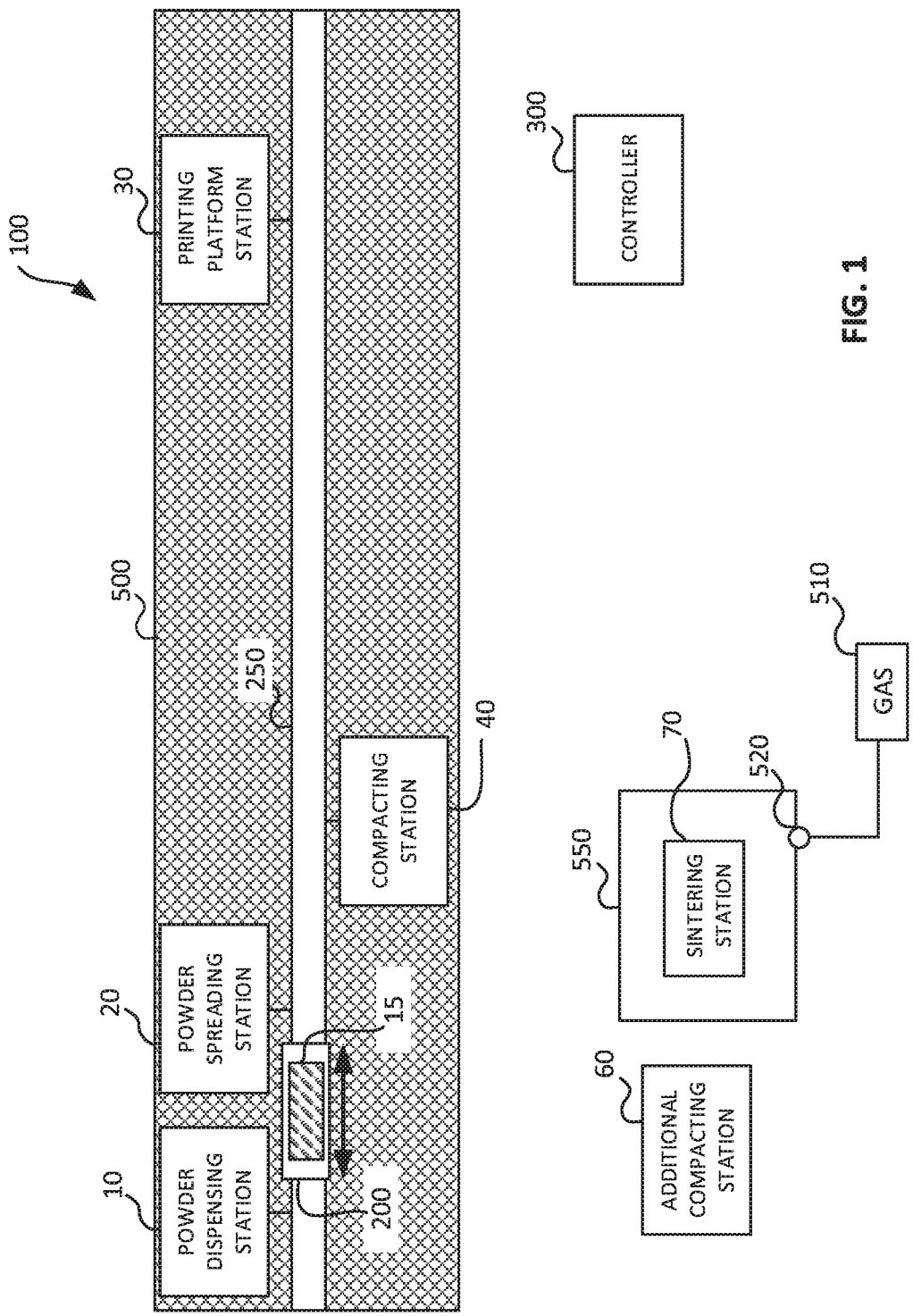
FIG. 1 is a simplified schematic drawing of an exemplary additive manufacturing system in accordance with some embodiments of the present invention.

The present invention, in some embodiments thereof, relates to the field of additive manufacturing and, more particularly, but not exclusively, to methods, apparatus and systems for producing 3D printed models having a high material density.

As used herein, the terms "green block" and "green compact" are interchangeable. Further as used herein, "green compacts of usable models" and "green bodies" are interchangeable. The terms "object", "model" and "usable model" as used herein are interchangeable.

Additionally as used herein, "green compacts of support elements", "support element", "discrete sections of a support area" and "discrete sections" are interchangeable.

As used herein, the terms "green block", "green compact", "green compacts of usable models", "green bodies", "green compacts of support elements", respectively refer to a "block", a "compact", "compacts of usable models", "bodies", and "compacts of support elements" whose main constituent is a bound material, typically in the form of bonded powder, prior to undergoing a sintering process.

Furthermore, the terms "mask", "pattern", "mask pattern" or "printed pattern" are deemed to refer to a pattern formed with a solidifiable non-powder material, e.g. solidifiable ink.

Some additive manufacturing processes yield a green block comprising powder layers and a non-powder solidified material that has been printed or deposited independently from the powder layers. In some embodiments, the green block can be produced by compacting powder layers in which, for at least some of the compacted layers, a solidifiable non-powder material has been deposited before compaction. The green block typically comprises a green compact of a usable model (also referred to as an "object"), a green compact of a support element, and a non-powder solidified material, for instance an ink that has been deposited by an inkjet print head and that solidifies after jetting (also referred to as "solidifiable ink"). In some embodiments, the solidifiable ink is deposited following a specific pattern in order to delimit the contour or shape of a model, and separate its surfaces from the surfaces of other models or supporting elements within the block. In some embodiments, the solidifiable ink is selectively dispensed by a 3D printer during the additive manufacturing process, after a previous powder layer has been compacted. The printed pattern may define a boundary, e.g. physical separation between objects and surrounding powder material. The pattern may also divide the support area within the block into discrete sections to ease removal of support elements when separating or extracting the green compact of the usable model from the block. During the additive manufacturing process, die compaction may be applied per layer to remove excess air from the layers. Optionally, the powder layers may reach a density of 85-90% of a wrought density of the material from which the powder is formed.

In some embodiments, the pattern is printed with a solidifiable non-powder material, e.g. a solidifiable ink. A solidifiable ink, as referred to herein, refers to an ink material that is solid at ambient temperature and liquid at the moment of printing. Non-limitative examples of solidifiable inks include photocurable inks, wax, thermal inks and any combination thereof. Thermal ink and phase change ink as used herein are interchangeable terms and may be defined as a material that is solid at room temperature, has a melting point of less than 120° C., viscosity of less than 50 cPs between the melting point temperature and 120° C. and that evaporates with substantially no carbon traces at a temperature of above 100° C. Substantially, no carbon traces may be defined as less than wt. 5% or less than wt. 1% of the solidified ink. The thermal ink has a melt temperature of between 55-65° C. and a working temperature of about 65-75° C., the viscosity may be between 15-17 cPs. The thermal ink is configured to evaporate in response to heating with little or no carbon traces.

According to some example embodiments, the green compacts of usable models may be further post processed, e.g. may be further compacted to remove excess air over one or more steps prior to sintering. The post processing process may include a Cold Isostatic Pressing (CIP) process, a pattern removal process (also generally referred to as a "de-waxing process") and a furnace sintering process. According to some exemplary embodiments, at the termination of the building process of the green block, further compaction of the green block is achieved with a CIP station. The CIP station may be used to increase density of the green compact of usable models included within the green block prior to sintering. In some example embodiments, during CIP, the green block may optionally be wrapped in a fabric and sealed in wet-bag. A vacuum may be applied to remove air from the wet-bag prior to sealing the wet-bag. CIP may be applied with solidifiable ink contained in the green block. In that way, the density of the green compact of usable models included within the block may be increased from about 85-90% of the wrought density of the building material to about 90-95%. Reaching a density above 95% of wrought density of the building material may be difficult due to the presence of solidified non-powder material in the green block, as the solidified non-powder material may be incompressible or less compressible than the powder material.

According to some example embodiments, at the end of CIP, the green block may be placed in a "de-waxing" station where it may be heated to a temperature that causes the solidified non-powder material, e.g. solidified ink, to burn, liquefy or evaporate (i.e. de-waxing process). For instance, a temperature in the range of about 100-1,000° C., 200-800° C., 300-600° C., or 350-500° C. may be applied. After removal of the solidified non-powder material, the green compact of usable models included in the green block may be separated or extracted from the green block by removing green compacts of support elements. The green usable models may then be sintered.

According to additional example embodiments, a CIP process may be applied after the de-waxing process and prior to sintering, to further increase the density of the green usable models after their separation or extraction from the green block. During this CIP process, the green usable models may be inserted into a wet-bag, and may be padded or surrounded with, and/or be filled with a material that is intended to cushion the models during the CIP process and maintain their structural integrity. In some embodiments, the cushioning material may be a powder formed from wax e.g., paraffin wax. Air may be removed prior to sealing the wet-bag. During this CIP process, pressure may first be elevated to a first level, for instance a level where the cushioning material will melt and begin to flow. Flowing of the cushioning material may allow its penetration into hollow parts included in the object, such as crevices, channels, tubes or orifices so that the geometry of the object may be fully supported (i.e. protected from deformation) during the CIP process. A viscosity of the cushioning material may be selected so as to avoid filling pores within the object that are meant to collapse during the compaction process. After a defined delay the pressure may be further elevated to a second level to compact the green usable models. Optionally, this CIP process compacts the green usable models to remove substantially all air between powder particles in the object, so that the material forming the object has a density of 100% of the wrought density or close to 100% density, e.g. 97% and above.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1 shows a simplified block diagram of an exemplary additive manufacturing system in accordance with some embodiments of the present invention. According to some embodiments of the present invention, an additive manufacturing system 100 includes a working platform 500 on which a building tray 200 is advanced through a plurality of stations for building a green block, e.g. a block of powder layers 15, one layer at a time. Typically, a precision stage 250 advances building tray 200 to each of the stations in a cyclic process. The stations may include a printing platform station 30, for printing a pattern of a non-powder solidifiable material, a powder dispensing station 10 for dispensing a powder layer, a powder spreading station 20 for spreading the layer of dispensed powder, and a compacting station 40 for compacting the layer of powder and/or the printed pattern. Typically for each layer, building tray 200 advances to each of the stations and then repeats the process until all the layers have been printed. According to some embodiments of the present invention, a controller 300 controls operation of each of the stations on a working platform 500 and coordinates operation of each of the stations with positioning and/or movement of tray 200 on precision stage 250. Typically, controller 300 includes and/or is associated with memory and processing ability. Optionally, powder dispensing station 10 and powder spreading station 20 are combined into a single powder delivery station.

According to some example embodiments, the additive manufacturing system includes an additional compacting station 60, for instance a CIP station. In some example embodiments, the green block manufactured on working platform 500 may be further compressed in the additional compacting station 60 after the layer building process is completed. Optionally, prior to compressing, the green block is placed in a wet-bag and air is extract from the wet-bag. A wet-bag is a flexible enclosure through which fluid does not penetrate, e.g. a rubber bag. In some example embodiments, additional compacting station 60 may be used both to compress the green block and then again to compress the green compacts of usable models once they have been extracted from the green block.

In some embodiments, furnace sintering may be applied after one or two CIP processes. Temperatures and duration of sintering typically depends on the powder material used and optionally on the size of the object. Optionally sintering is performed in an inert gas environment. Optionally, an inert gas source 510 is source of nitrogen.

In some example embodiments, the additive manufacturing system described herein provides for printing at improved speed. For example, printing time per layer may be between 25-35 seconds and an estimated building time for a green block including 400 layers may be about 4 hours. A green block 15 built on building tray 200 may include a plurality of green usable models, e.g. 1-15 models. An example footprint of the block may be 20×20 cm.

Sintering station 70 and additional compacting station 60 may be standalone stations that are separated from working platform 500. Optionally, green block 15 is manually positioned into additional compacting station 60 and then into sintering station 70, and not via precision stage 250. Optionally, each of additional compacting station 60 and sintering station 70 have a separate controller for operating the respective station.

Figure 2:
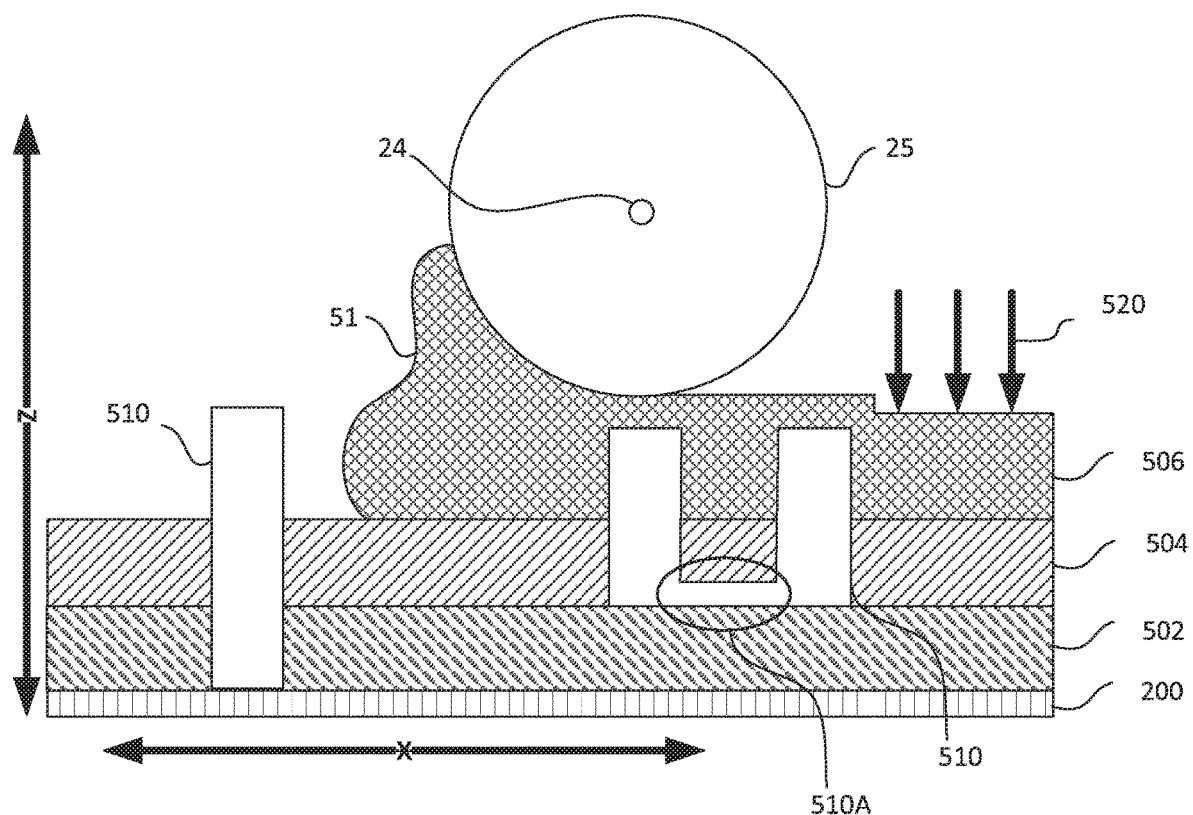
FIG. 2 is a simplified schematic drawing of an exemplary per layer building process (side-view) in accordance with some embodiments of the present invention.

Reference is now made to FIG. 2 showing a simplified schematic drawing of an exemplary per layer building process in accordance with some embodiments of the present invention. FIG. 2 shows an example third layer 506 in the process of being built over an example first layer 502 and second layer 504. In some exemplary embodiments, a pattern 510 is dispensed per layer with a three-dimensional printer. According to some exemplary embodiments, pattern 510 is formed from a solidifiable non-powder material such as a solidifiable ink. Pattern 510 may physically contact a pattern 510 in a previous layer or layers, e.g. layers 504 and 502, or may be patterned over an area of the previous layer including the powder material. A height of pattern 510 per layer may be substantially the same as a height of the layer or may optionally be shorter than a height of the layer, e.g. portion 510A of pattern 510 in layer 504.

According to some examples, powder 51 is spread over the pattern 510 and across a footprint of a building tray 200. In some example embodiments, powder 51 is spread with a roller 25. Optionally, roller 25 is actuated to both rotate about its axle 24 and to move across building tray 200 along an X axis. Once powder 51 is spread across the footprint of tray 200, compaction 520 may be applied on the entire layer to compact layer 506. Typically, a height of layer 506 is reduced due to process compaction, optionally as well as previous layers 502 and 504.

Figure 3:
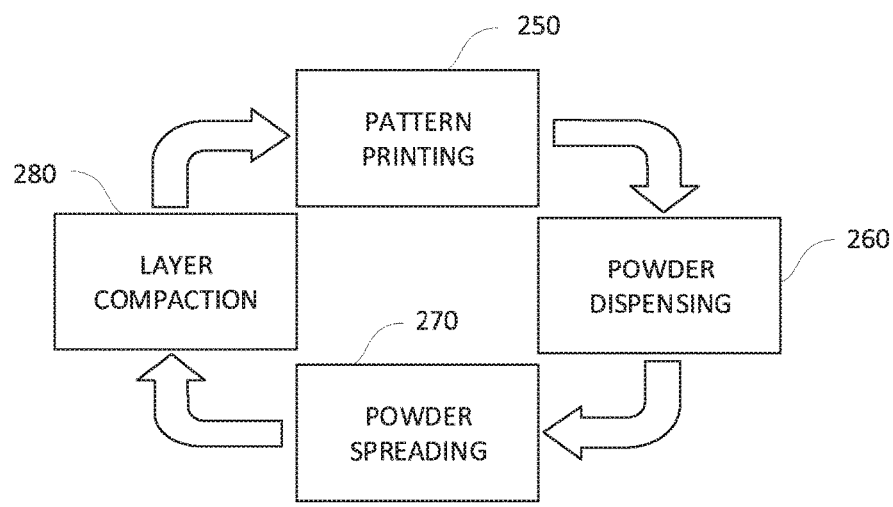
FIG. 3 is a simplified block diagram of an exemplary cyclic process for building layers in accordance with some embodiments of the present invention.

Reference is now made to FIG. 3 showing a simplified block diagram of an exemplary cyclic process for building green block layers in accordance with some embodiments of the present invention. According to some exemplary embodiments, an object (i.e. a green compact of a usable model) may be constructed layer by layer within a green block in a cyclic process. Each cycle of the cyclic process may include the steps of printing a pattern (block 250) at a printing platform station 30, dispensing (block 260) and spreading (block 270) a powder material over the pattern at a dispensing station 10 and a spreading station 20, and compacting the powder layer including the pattern (block 280) at a compacting station 40. In some embodiments, dispensing and spreading stations 10 and 20 are combined into one single station also referred to as "powder delivery station". In some exemplary embodiments, the pattern is formed from a solidifiable non-powder material such as a solidifiable ink. Compaction may comprise die compaction per layer. According to embodiments of the present invention, each cycle forms one layer of the green block and the cycle is repeated until all the layers have been built. Optionally, one or more layers may not require a pattern and the step of printing the pattern (block 250) may be excluded from selected layers. Optionally, one or more layers may not require powder material and the step of dispensing and spreading a powder material (blocks 260 and 270) may be excluded from selected layers. This cyclic process yields a green block, which includes one or more green compacts of usable models, one or more green compacts of support elements and a solidified non-powder material.

Figure 4A:
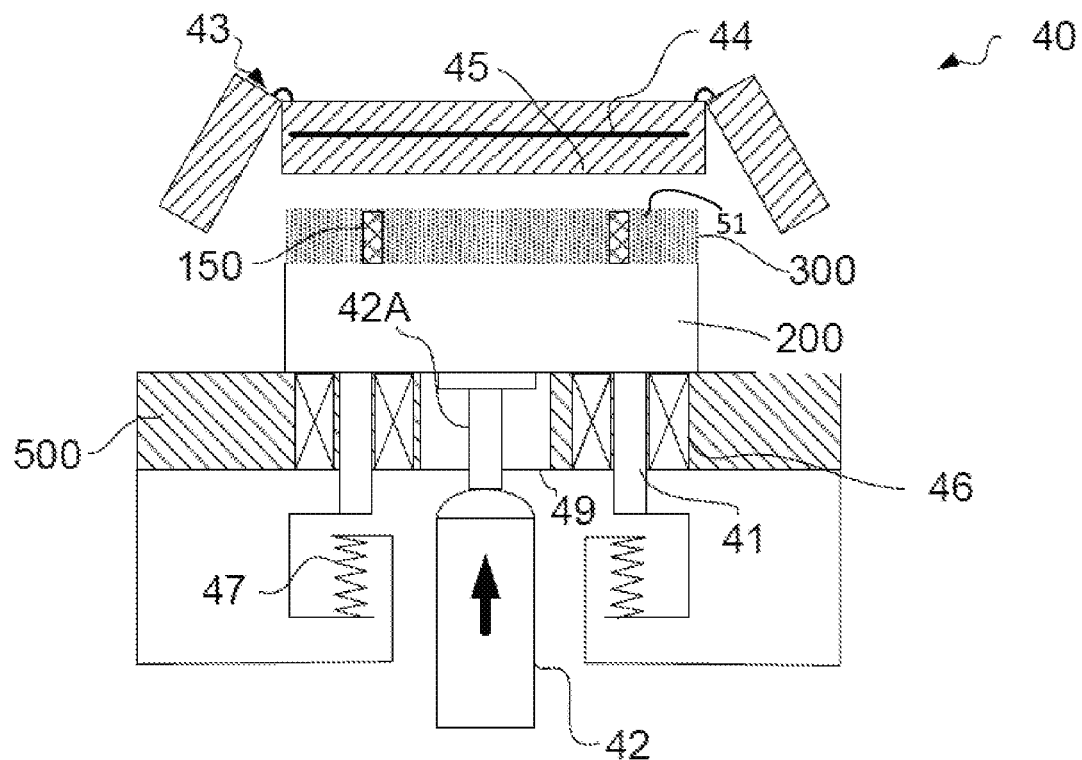
FIGS. 4A and 4B are simplified schematic drawings of an exemplary compacting system in a released and compressed state respectively (side-views) in accordance with some embodiments of the present invention.
Figure 4B:
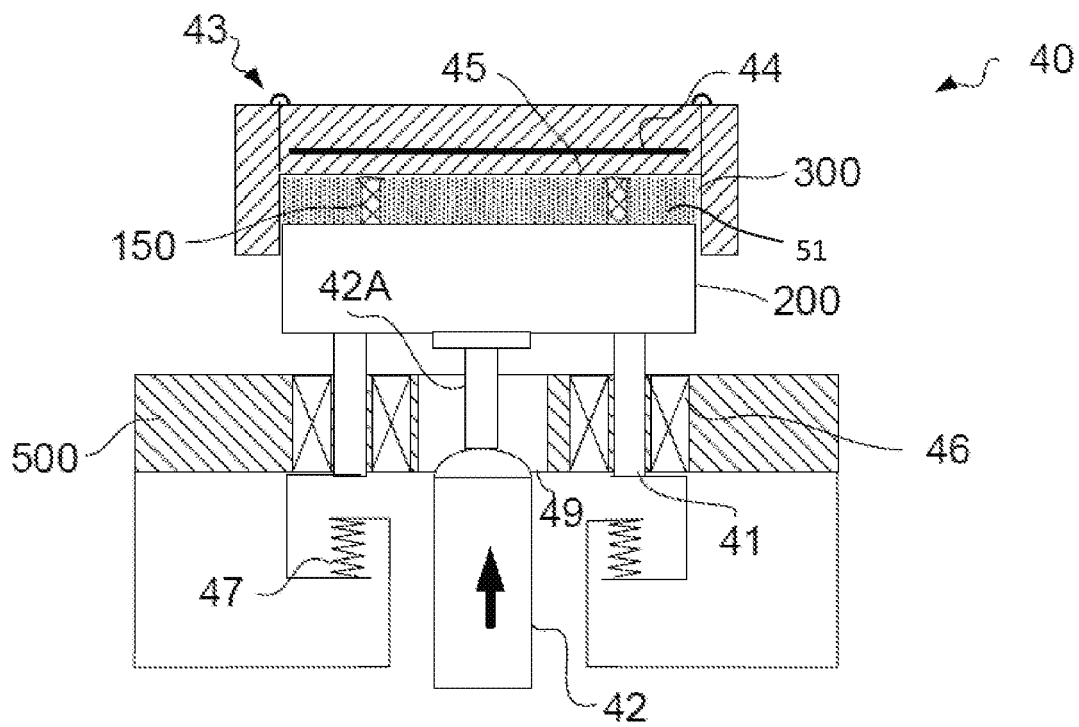

Reference is now made to FIGS. 4A and 4B showing a simplified schematic drawings of an exemplary die compaction station shown in a released and compressed state respectively in accordance with some embodiments of the present invention. A compacting station 40 may include a piston 42 that provides the compaction pressure for compacting a layer 300. During compaction, piston 42 may be raised through a bore 49 and optionally pushes rod 42A in working platform 500 or precision stage 250 and lifts building tray 200 towards a surface 45 positioned above tray 200. Rod 42A may function to reduce distance that piston 42 is required to move to achieve the compaction.

Optionally, once layer 300 makes contact with surface 45, walls 43 close in around the layer 300 to maintain a constant footprint of the layer 300 during compaction.

Building tray 200 may be secured to one or more linear guides 41 that ride along linear bearings 46 as piston 42 elevates and/or lowers tray 200. Optionally, tray 200 is lifted against one or more compression springs 47. Gravitational force as well as springs 47 may provide for lowering piston 42 after compacting layer 300.

A pressure of up to 250 MPa or 300 MPa may be applied to compact a layer. Typically, the applied pressure provides for removing air and bringing powder in layer 300 past its elastic state so that permanent deformation of the layer is achieved. Optionally, the compaction provides for increasing the relative density of the layer to about 70% to 75% of a wrought density of the powder material. For several alloys the relative density may reach up to 90% of the wrought density. Optionally, compaction reduces the thickness of a layer by up to 25%. Optionally, a compaction pressure of around 30-90 MPa is applied. Optionally, the compaction is performed at room temperature.

In some embodiments, upper surface 45 may be heated, e.g. pre-heated with a heating element 44 during compaction. When heating surface 45, layer 300 can reach its plastic and/or permanent deformation state with less pressure applied on the layer. Optionally, in aluminum powder case, upper surface 45 is heated to a temperature of 150° C., e.g. 150°-200° C. Typically there is a tradeoff between compaction temperature and pressure. Increasing the temperature during compaction may provide for reaching plastic deformation at lower pressure. On the other hand, reducing temperature of upper surface 45 may reduce the energy efficiency of the compaction since higher pressure may be required.

Figure 5A:
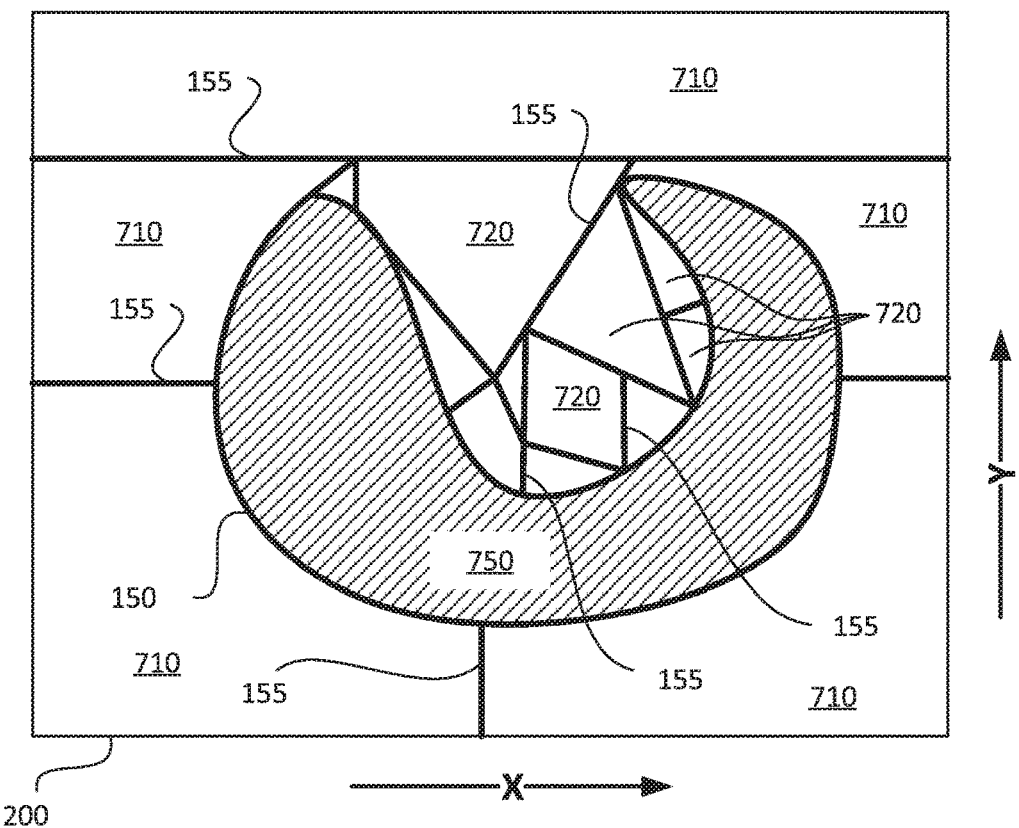
FIGS. 5A and 5B are simplified schematic drawings of example patterns formed in a layer to build an object (top-views) in accordance with some embodiments of the present invention.
Figure 5B:
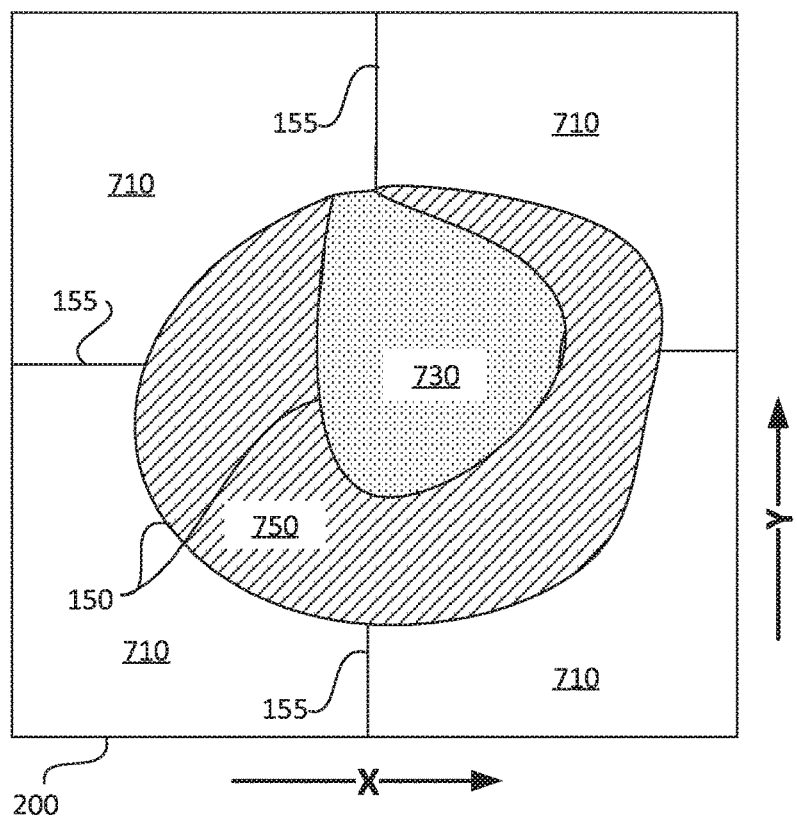

Reference is now made to FIGS. 5A and 5B showing simplified schematic drawings of example patterns formed in a layer to build a three-dimensional object in accordance with some embodiments of the present invention. According to example implementations, a solidifiable non-powder material, e.g. a solidifiable ink, traces a contour 150 of an object 750 and also divides the support area with patterning lines 155 into sections that can be easily separated from object 750 at the end of the green block building process. Some supports areas are divided into large support sections 710. Other support areas may be divided into smaller support sections 720 (FIG. 5A) that more carefully takes into account a geometry of object 750, and facilitate separation of support sections 720 from object 750 at the end of the green block building process. In some example embodiments, support sections 720 may be defined to provide a desired draft angle to ease extraction of object 750 from the green block. Both the size and the shape of support sections 720 may be defined to ease extraction of the object from the green block. Smaller support sections 720 may be defined near a surface of object 750 and larger support sections 710 may be defined away from the surface of object 750.

Referring now to FIG. 5B, negative masking may be applied in a defined support area where it may be difficult to remove whole solidified support sections, e.g. such as within cavities defined by object 750. Negative masking creates support section 730 that will remain in a powder state after the solidifiable non-powder material is removed and thus be easily removable from the cavity (i.e. as opposed to other support areas that solidify into discrete sections during the process). According to some example embodiments, negative masking is formed by dithering solidifiable non-powder material in a defined area 730. The degree of dithering may range between 5-50% or between 5-100% of solidifiable non-powder material in the layer. Typically, a partition of solidified non-powder material separates the negative mask from the object. Some portions of a layer may be patterned with negative mask while other portions may include a pattern that divides the support area into discrete sections 710. The solidifiable non-powder material may also be included in areas of a layer to provide structural support to the green block.

Figure 6:
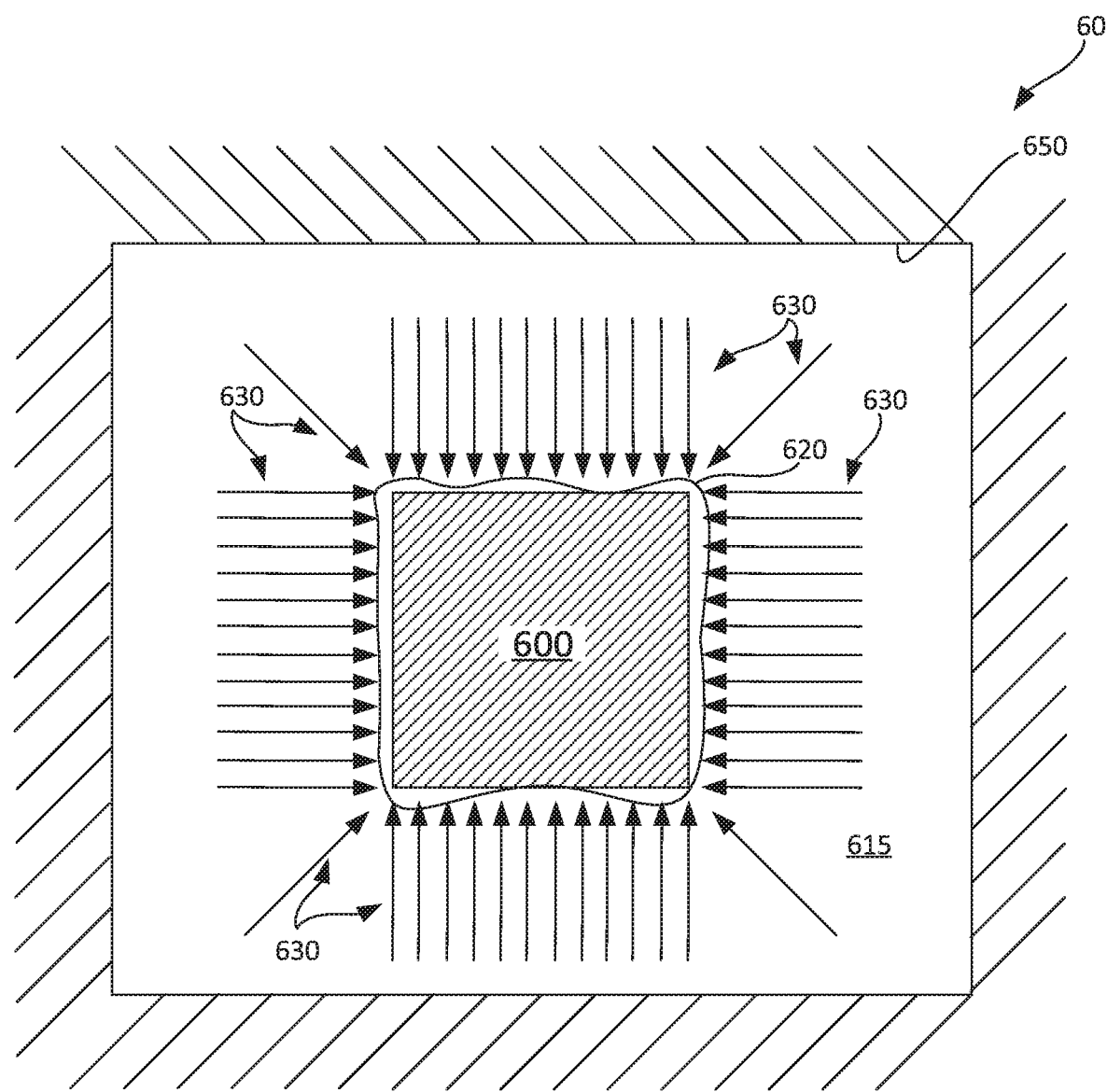
FIG. 6 is a simplified block diagram of a green block comprising compacted powder layers being processed in a CIP station in accordance with some embodiments of the present invention.

Reference is now made to FIG. 6 showing a simplified block diagram of a green block, which comprises a compacted powder material optionally including a solidified non-powder material (e.g. a solidified ink), being compacted in a CIP station in accordance with some embodiments of the present invention. According to some example embodiments, the additional compacting station 60 is a CIP station that includes a CIP chamber 650 in which an object may be compacted by applying a substantially uniform pressure 630 around the object placed in a wet-bag 620 with a fluid 615 contained in chamber 650. In some example embodiments, a green block 600, built by an additive manufacturing (AM) method, is compacted in a chamber of a compacting station 60. The green block 600 may include a powder material and a solidified non-powder material, e.g. solidifiable ink. During compaction, green block 600 is inserted in wet-bag 620. Optionally air is extracted from the volume of wet-bag 620 with a vacuum. Wet-bag 620 including green block 600 may then be compacted by CIP. The CIP may substantially maintain the proportions of green block 600 as well as of the usable model(s) embedded therein during compaction. The CIP may be performed with a pressure of up to about 2,500 bar and optionally at a temperature of up to 40° C. In some example embodiments, green block 600 is wrapped with a fabric prior to insertion to the wet-bag.

Figure 7:
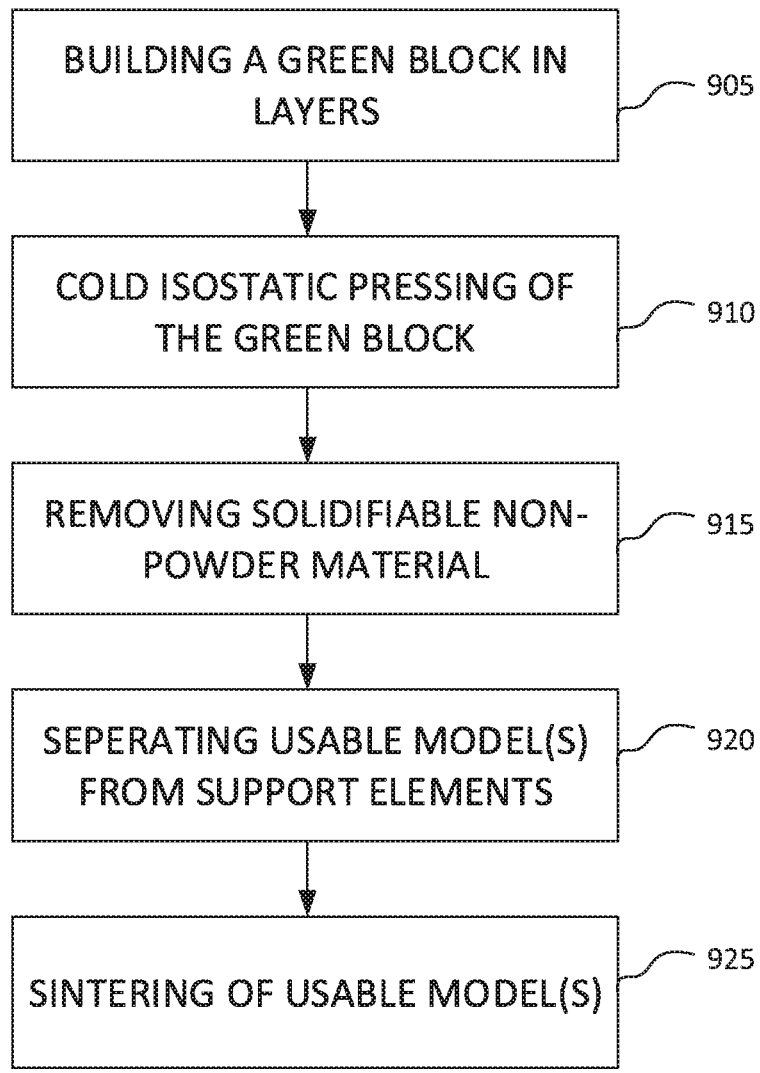
FIG. 7 is a simplified flow chart of an example method for manufacturing a three-dimensional model in accordance with some embodiments of the present invention.

Reference is now made to FIG. 7 showing a simplified flow chart of an example method for manufacturing a three-dimensional model in accordance with some embodiments of the present invention. A layer building process may be performed to build a green block comprising a powder material and a solidified non-powder material, e.g. a solidified ink, in which one or more green compacts of usable models and one or more green compacts of support elements are delimited by a solidified non-powder material (block 905). At the termination of the building process, CIP may be applied to the green block to provide additional compaction (block 910). During CIP, an isostatic pressure may be applied by a liquid surrounding the block as opposed to the unidirectional pressure applied per layer during the layer building process. At the termination of the CIP, the green block may be heated, to melt, burn or evaporate the non-powder solidified material comprised therein (block 915). Once the solidified non-powder material is removed, the green usable model(s) may be separated from the green support elements (block 920), and the green usable model(s) may be sintered (block 925).

Figure 8:
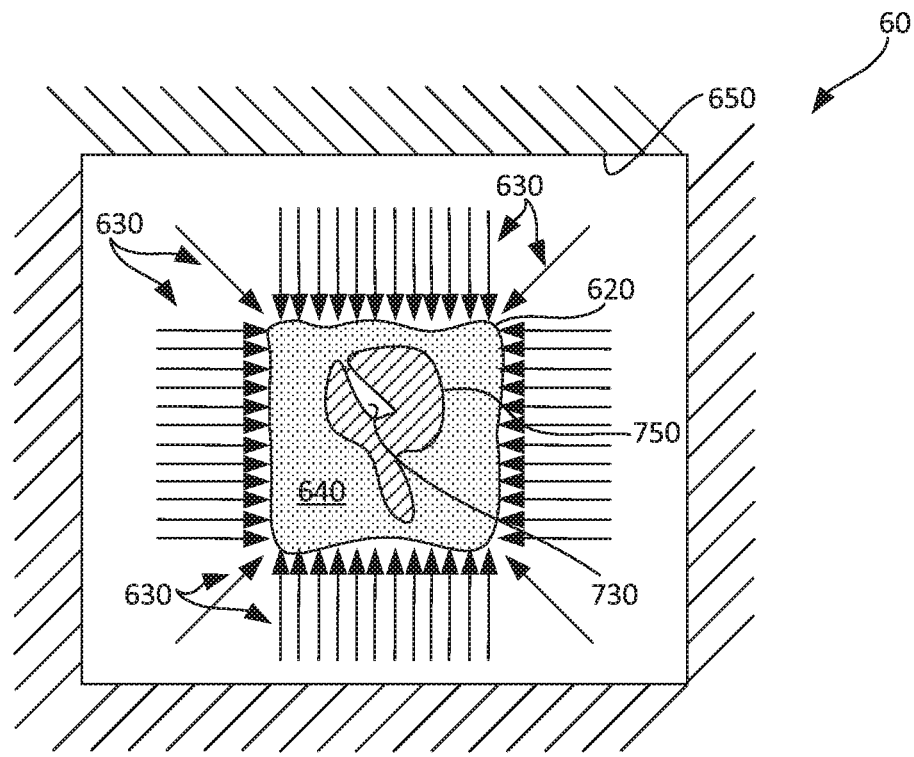
FIG. 8 is a simplified block diagram of a green compact of a usable model being compacted in a CIP station in accordance with some embodiments of the present invention.
Figure 9:
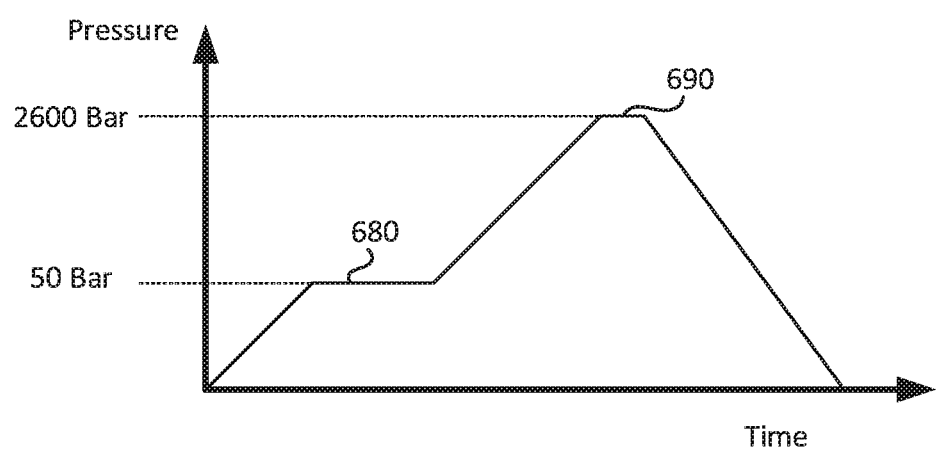
FIG. 9 is a simplified graph of example pressures applied during a CIP process of a green compact of a usable model in accordance with some embodiments of the present invention.

Reference is now made to FIG. 8 showing a simplified block diagram of a green model being compacted in a CIP station and to FIG. 9 showing a simplified graph of exemplary pressures applied during this CIP process, in accordance with some embodiments of the present invention. Optionally, this CIP process is intended to further compact the green model prior to sintering and occurs after having applied a first CIP to the green block including the green model and extracting the green model from said block. Optionally, during this CIP process substantially all the air in the powder used to build the green usable model may be removed, e.g. yielding a 100% (or at least 97% or 98%) wrought density of the powder material used to build the object. During this CIP process, the green usable model may be inserted in a wet-bag 620 together with a cushioning material 640, e.g. a powdered wax, and air may be removed from the wet-bag 620. This CIP process may be performed in two steps. Over a first step, wet-bag 620 may be pressurized to a first pressure level 680 (FIG. 9), e.g. 50 bar at which cushioning material 640 in wet-bag 620 may melt. Once cushioning material 640 melts, it may flow into any hollow structures (e.g. channels, crevices) defined by the object geometry to help maintain the structural integrity of the model during compression. Optionally, heat may be applied to melt the cushioning material. The second stage of this CIP process may be performed once the cushioning material is melted and has spread into the hollow structures. In some example embodiments, during the second stage, additional pressure (690) is applied over a defined duration to compact the green model 750. Optionally up to 2,600 Bar may be applied. After pressure 690 is released, the green model may be removed from wet-bag 620 and sintered. In some embodiments, the first pressure level 680 is applied during a time window of between 1 and 60 min, 2 and 30 min, or 5 and 15 min. In case of using a cushioning material in a powder form, e.g. a powder wax, and melting of said powder is made by heat, the delay time to reach the full pressure application may be shortened and can last up to 1 min.

Figure 10:
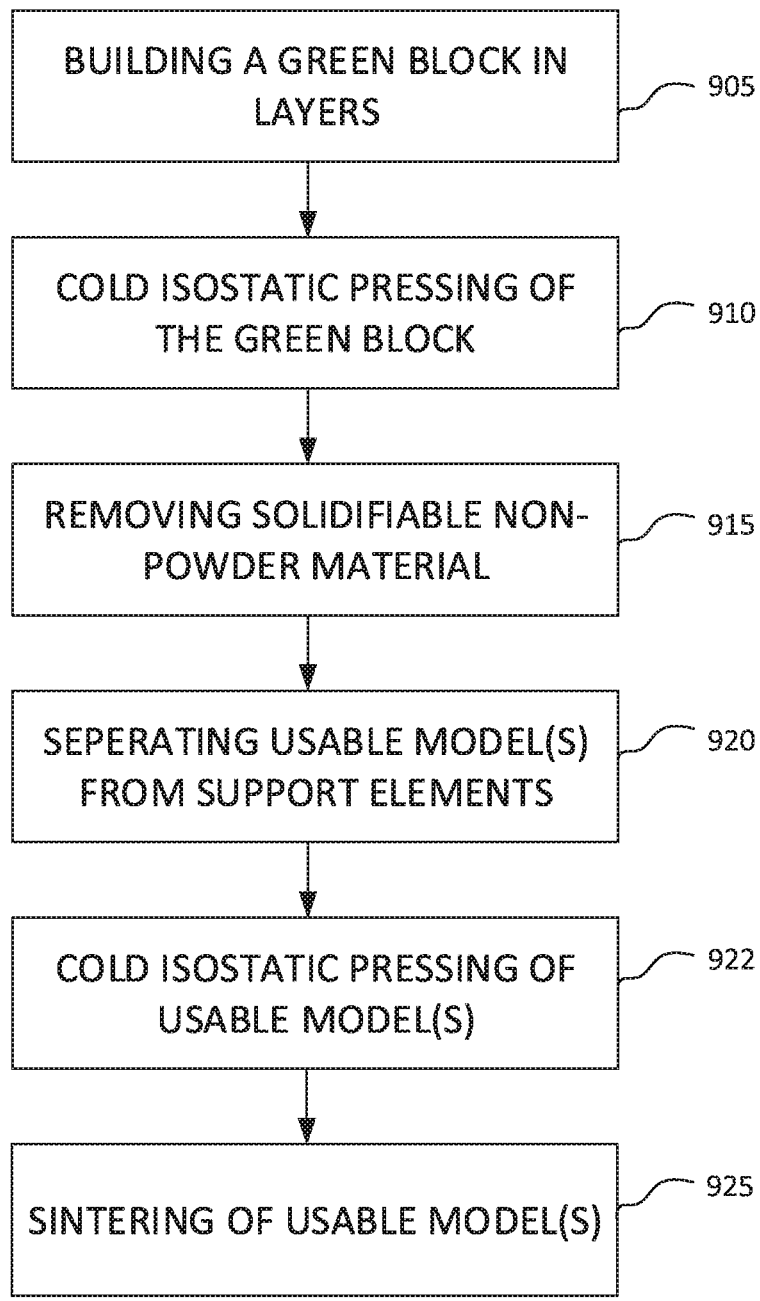
FIG. 10 is a simplified flow chart of an additional example method for manufacturing a three-dimensional model in accordance with some embodiments of the present invention.

Reference is now made to FIG. 10 showing a simplified flow chart of an additional example method for manufacturing a three-dimensional model in accordance with some embodiments of the present invention. A layer building process may be performed to build a green block comprising a powder material and a non-powder material, e.g. a solidified ink, in which one or more green compacts of usable models and one or more green compacts of support elements are delimited by a solidified non-powder material (block 905). At the termination of the building process, CIP may be applied on the green block to provide additional compaction (block 910). During CIP, density of building material forming the object may reach about 85-90% to about 90-97% of a wrought density of the material. At the termination of the CIP, the green block may be heated to a temperature at which the non-powder solidified material melts, burns or evaporates (block 915). Once the solidified material is removed, the one or more green models may be separated from the green support elements (block 920). The extracted green models may then be compacted again over a second CIP process (block 922). During the second CIP process, the models are padded or surrounded with, and/or be filled with a cushioning material to help preserve the models structural integrity. In some embodiments, the cushioning material may be a powder formed from wax e.g., paraffin wax. This second CIP process may include applying a first pressure level at which the cushioning material melts and then applying a second pressure level at which the green models are compacted to reach almost 100% of a wrought density of the powder material. Alternatively, a continuous incremental pressure may be applied. After the second CIP process, the green models may be sintered to form the final three-dimensional models (block 925).

Figure 11:
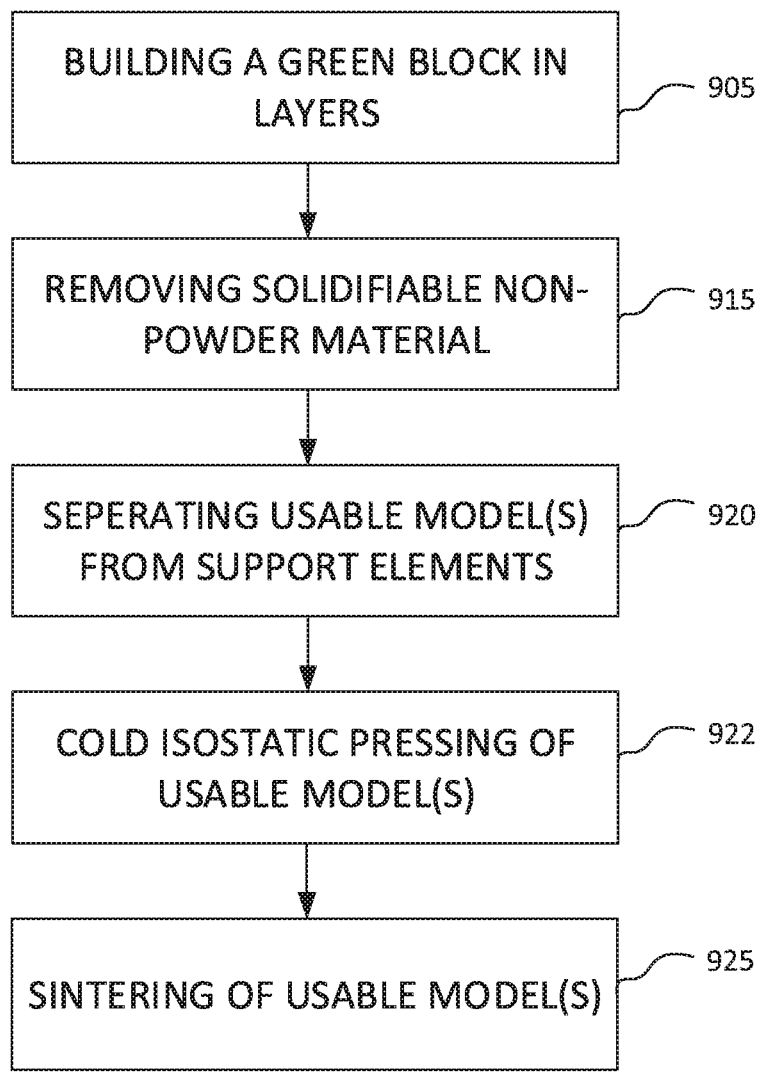
FIG. 11 is a simplified flow chart of a further example method for manufacturing a three-dimensional model in accordance with some embodiments of the present invention.

Reference is now made to FIG. 11 showing a simplified flow chart of an additional example method for manufacturing a 3D printed model in accordance with some embodiments of the present invention. A layer building process may be performed to build a green block comprising a powder material and a non-powder solidified material, e.g. a solidified ink, in which one or more green compacts of usable models and one or more green compacts of support elements are delimited by a solidified non-powder material (block 905). At the termination of the layer building process, the green block may be heated to a temperature at which the non-powder solidified material melts, burns or evaporates (block 915). Once the non-powder solidified material is removed, the one or more green compacts of models may be separated from the support elements (block 920). The extracted models may then be compacted over a CIP process (block 922), in which the extracted models are padded or surrounded with, and/or be filled with a cushioning material to help preserving the models structural integrity. In some embodiments, the cushioning material may be a powder formed from wax e.g., paraffin wax. This CIP process may include applying a first pressure level at which the cushioning material melts and then applying a second pressure level at which the models are further compacted to reach almost 100% of a wrought density of the material. Alternatively, a continuous incremental pressure may be applied. After this CIP process, the green models may be sintered to form the final three-dimensional models (block 925).

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

What is claimed is:

1. A method for producing a three-dimensional model via additive manufacturing, the method comprising:
building a green block in a layerwise manner with a powder material and a solidifiable non-powder material based on an additive manufacturing process, the green block including a green usable model;
removing the solidified non-powder material from the green block to extract the green usable model from the green block;
applying Cold Isostatic Pressing (CIP) after completing the building of the green block, wherein the CIP is configured to increase the density of the powder material forming the green usable model; and
sintering the green usable model to produce a three-dimensional model;
wherein the CIP is applied to the green usable model after extraction from the green block.

2. The method of claim 1, wherein the CIP is also applied to the green block including the green usable model before the extraction.

3. The method of claim 1, wherein the green usable model is a green compact of a usable model.

4. The method of claim 1, wherein the step of building a green block in a layerwise manner is performed via an additive manufacturing system configured to build a layer by (1) printing a pattern with a solidifiable non-powder material to trace the contour of the green usable model; (2) dispensing and spreading a powder material over said pattern; and (3) compacting the powder layer with said pattern.

5. The method of claim 1, wherein the powder material is selected from an alloy powder, a pure metal powder, a ceramic powder, a polymeric powder, and any combination or mixture thereof.

6. The method of claim 5, wherein the powder material is an aluminum alloy.

7. The method of claim 1, wherein said solidifiable non-powder material is a solidifiable ink selected from photocurable inks, wax, thermal inks and any combination thereof.

8. The method of claim 1, wherein the step of removing the solidified non-powder material from the green block is made by heating the green block to melt, burn or evaporate the solidified non-powder material.

9. The method of claim 1, wherein the green block also includes green support elements and wherein the green usable model is extracted from the green block by removing the green support elements.

10. The method claim 2, wherein applying a CIP to the green block comprises inserting the green block into a wet-bag, optionally removing the air from the wet-bag, placing the wet-bag into a CIP chamber, and applying an isostatic pressure to the wet-bag comprising the green block.

11. The method of claim 10, wherein the isostatic pressure is up to 2,500 bar.

12. The method of claim 3, wherein applying a CIP to the green usable model after extraction from the green block comprises inserting the green usable model into a wet-bag together with a cushioning material, optionally removing air from the wet bag, placing the wet-bag into a CIP chamber, and applying an isostatic pressure to the wet-bag comprising the green usable model.

13. The method of claim 12, wherein the isostatic pressure is applied in two steps, wherein the first step comprises applying a first isostatic pressure sufficient to melt the cushioning material to make it flow within the hollow structure of the green usable model, and the second step comprises applying a second isostatic pressure to compact the green usable model.

14. The method of claim 13, wherein the cushioning material is powdered wax, the first isostatic pressure is up to 50 bar and the second isostatic pressure is up to 2,600 bar.

15. The method according to claim 1, wherein a temperature applied during the CIP is 40° C.

16. A method for producing three-dimensional models via additive manufacturing, said method comprising:
- building a green block in a layerwise manner with a powder material and a solidifiable non-powder material, said green block including one or more green compacts of a usable model and one or more green compacts of support elements, wherein the usable models and the support elements are delimited by patterning lines formed by selective deposition of the solidifiable non-powder material;
- applying CIP to the green block after completing the building of the green block, wherein the CIP is configured to increase the density of the powder material forming the one or more green compacts;
- heating the green block to remove the solidified non-powder material;
- extracting the one or more green compacts of a usable model from the green block by removing the one or more green compacts of support elements; and
- sintering the one or more green compacts of a usable model to produce three-dimensional models.

17. A method for producing three-dimensional models via additive manufacturing, said method comprising:
- building a green block in a layerwise manner with a powder material and a solidifiable non-powder material, said green block including one or more green compacts of a usable model and one or more green compacts of support elements, wherein the usable models and the support elements are delimited by patterning lines formed by selective deposition of the solidifiable non-powder material;
- applying a first CIP to the green block after completing the building of the green block, wherein applying the first CIP is configured to increase the density of the powder material forming the one or more green compacts;
- heating the green block to remove the solidified non-powder material;
- extracting the one or more green compacts of a usable model from the green block by removing the one or more green compacts of support elements;
- further increasing the density of the one or more green compacts of a usable model by applying a second CIP to said one or more green compacts after their extraction from the green block;
- sintering the one or more green compacts of a usable model to produce three-dimensional models.

18. A method for producing three-dimensional models via additive manufacturing, said method comprising:
- building a green block in a layerwise manner with a powder material and a solidifiable non-powder material, said green block including one or more green compacts of a usable model and one or more green compacts of support elements, wherein the usable models and the support elements are delimited by patterning lines formed by selective deposition of the solidifiable non-powder material;
- heating the green block to remove the solidified non-powder material;
- extracting the one or more green compacts of a usable model from the green block by removing the one or more green compacts of support elements;
- applying a CIP to said one or more green compacts after their extraction from the green block, wherein applying the CIP is configured to increase the density of the powder material forming the one or more green compacts;
- sintering the one or more green compacts of a usable model to produce three-dimensional models.

19. A method for increasing the density of a green usable model, said method comprising inserting said green usable model into a wet-bag together with a cushioning material, optionally removing the air from the wet bag, placing said wet-bag into a CIP chamber, and applying an isostatic pressure to said wet-bag to increase the density of said green usable model;
- wherein the isostatic pressure is applied in two steps, wherein the first step comprises applying a first isostatic pressure sufficient to melt the cushioning material and make it flow within hollow structures of the green usable model, and the second step comprises applying a second isostatic pressure to increase the density of said green usable model while the cushioning material helps maintain the structural integrity of the green usable model.

20. The method of claim 19, wherein the cushioning material is powdered wax, the first isostatic pressure is up to 50 bar and the second isostatic pressure is up to 2,600 bar.

21. A method for producing a three-dimensional model via additive manufacturing, the method comprising:
- building a green block in a layerwise manner with a powder material and a solidifiable non-powder material based on an additive manufacturing process, the green block including a green usable model;
- removing the solidified non-powder material from the green block to extract the green usable model from the green block;
- applying Cold Isostatic Pressing (CIP) after completing the building of the green block, wherein the CIP is configured to increase the density of the powder material forming the green usable model; and
- sintering the green usable model to produce a three-dimensional model;
- wherein a first CIP is applied to the green block including the green usable model and a second CIP is applied to the green usable model after separation from the green block.

* * * * *